United States Patent [19]

Freese et al.

[11] Patent Number: 4,569,881
[45] Date of Patent: Feb. 11, 1986

[54] MULTI-LAYER AMORPHOUS MAGNETO OPTICAL RECORDING MEDIUM

[75] Inventors: Robert P. Freese, Lake Elmo, Minn.; Leslie H. Johnson, Hudson, Wis.; Thomas A. Rinehart, St. Paul; Richard N. Gardner, Grant Township, Washington County both of Minn.

[73] Assignee: Minnesota Mining and Manufacturing Company, St. Paul, Minn.

[21] Appl. No.: 599,647

[22] Filed: Apr. 12, 1984

Related U.S. Application Data

[63] Continuation-in-part of Ser. No. 495,176, May 17, 1983, abandoned.

[51] Int. Cl.[4] .............................................. G11B 9/00
[52] U.S. Cl. .................................. 428/213; 360/131; 360/135; 365/122; 428/694; 428/697; 428/900
[58] Field of Search .............. 365/122; 428/69 T, 900, 428/213, 694, 692; 204/192 M, 192 R; 360/131, 135

[56] References Cited

U.S. PATENT DOCUMENTS

| | | | |
|---|---|---|---|
| 3,224,333 | 12/1965 | Kolk, Jr. et al. | 88/61 |
| 3,228,015 | 1/1966 | Miyata et al. | 340/174 |
| 3,427,154 | 2/1969 | Mader et al. | 75/134 |
| 3,472,575 | 10/1969 | Hunt | 350/151 |
| 3,474,428 | 10/1969 | Nelson et al. | 340/174 |
| 3,514,766 | 5/1970 | Mee et al. | 340/174 |
| 3,530,441 | 9/1970 | Ovshinsky | 340/175 |
| 3,594,064 | 7/1971 | Bierlein | 350/151 |
| 3,650,601 | 3/1972 | Bierlein | 350/151 |
| 3,651,281 | 3/1972 | Becker | 179/100 |
| 3,696,352 | 10/1972 | Schilling | 340/174 |
| 3,838,450 | 9/1974 | Bongers et al. | 360/59 |
| 3,949,387 | 4/1976 | Chaudhari et al. | 340/174 |
| 3,969,463 | 6/1976 | Chaudhari et al. | 340/174 |
| 4,024,341 | 8/1977 | Smeggil | 428/678 |
| 4,101,907 | 7/1978 | Bell et al. | 346/135 |
| 4,310,899 | 1/1982 | Biesterbos et al. | 365/113 |
| 4,329,575 | 5/1982 | Roach | 235/487 |
| 4,334,007 | 6/1982 | Tinet et al. | 430/270 |
| 4,334,233 | 1/1982 | Murakami | 346/135 |
| 4,347,112 | 8/1982 | Togami | 427/255 |
| 4,367,257 | 1/1983 | Arai et al. | 428/220 |
| 4,390,600 | 6/1983 | Ohta et al. | 428/64 |
| 4,404,077 | 9/1983 | Fournier | 204/192 |
| 4,414,650 | 11/1983 | Ohta et al. | 365/122 |

FOREIGN PATENT DOCUMENTS

| | | |
|---|---|---|
| 56-143547 | 10/1981 | Japan . |
| 56-146207 | 11/1981 | Japan . |
| 2049730 | 12/1980 | United Kingdom . |
| 2071696 | 9/1981 | United Kingdom . |

OTHER PUBLICATIONS

Hunt, R. P., *IEEE Transactions on Magnetics*, vol. Mag. 5, #4, Dec. 1969, pp. 700–713.
Honda, S., et al., "Dynamic Behavior of Small Bits Written by Laser Irradiation on GdFe Films", *J. Appl. Phys.*, Mar., 1981, p. 2295.

(List continued on next page.)

*Primary Examiner*—George F. Lesmes
*Assistant Examiner*—William M. Atkinson
*Attorney, Agent, or Firm*—D. M. Sell; J. A. Smith; D. B. Little

[57] ABSTRACT

A multi-layer magneto optical thin film recording medium is disclosed having very high carrier-to-noise ratios (at least 47 decibels) and high rotation angles. A transmission electron microscope photomicrograph (at 200,000 X) of one such medium is shown in FIG. 1. The magneto optic layer is a multi-phase amorphous material having magnetic anisotropy perpendicular to the plane of the thin film produced in a triode vacuum sputtering process at vacuums in the range of $4 \times 10^{-3}$ to $6 \times 10^{-4}$ Torr. Various transparent layers, such as dielectric intermediate and anti-reflective layers and a protective covering layer, are combined with the magneto optic layer and a reflective surface to yield media having enhanced carrier-to-noise ratio and magnetic optic angle of rotation.

26 Claims, 3 Drawing Figures

OTHER PUBLICATIONS

Mansuripur, M., et al., "Optimum Disk Structures and Energetics of Domain Formation in Magneto-Optical Recording" *IEEE Transactions on Magnetics*, Nov. 1982, p. 1241.

Mimura, Y., et al., "Thermomagnetic Writing on Gd—Fe and Gd—Fe—Y Amorphous Films", *Jap. J. App. Phys.*, Aug., 1978, p. 1365.

Kowalski, D. C., et al., "High Data Rate Erasable Magneto Optic Media Tester".

Katayama, H., et al., "Study of High Reliability of the Magneto Optic Medium with the Multi-Layer Structure" Nov., 1983 Annual Conference in Japan.

Takahashi, A., et al., "Magneto Optic Properties of GdTbFe Thin Films" Nov., 1983 Annual Conference of the Magnetics Society of Japan.

Nomura, T., "Recent Trends in Magneto-Optic Disk", *Technocrat*, Mar., 1983.

Imamura, N., "Research Applies Magnetic Thin Films and the Magneto-Optical Effect in Storage Devices", *Journal of Electronic Engineering*, pp. 100–103, Mar. 1983.

Imamura, N., "The Development of Magneto-Optical Disk Memory with Semiconductor Lasers", K.D.D. Research Development Laboratory, Tokyo, Japan, Jan. 17-20, 1983.

Bell, A. E., "Optical Data Storage", *Laser Focus*, Jan., 1983.

Ohta, K., et al., "Magneto-Optical Disk with a Reflecting Layer", Jan. 17-20, 1983, Optical Data Storage Conference at Incline Village, Nevada.

Allen, R., and Connell, G. A. N. "Magneto-Optic Properties of Amorphous Terbium-Iron", *J. Appl. Phys.*, Mar. 1982, pp. 2353–2355.

Togami, Y., et al., "Amorphous GdCo Disk for Thermomagnetic Recording", *J. Appl. Phys.*, Mar., 1982, pp. 2335–2337.

Chen, Tu, et al., "Thickness Dependence of Magneto-Optical Effects in Tb—Fe Film" presented as a paper at the Optical Storage Data Conference, Jan. 17-20, 1983.

Mansuripur, M., et al., "Signal-to-Noise in Magneto-Optic Storage" S.P.I.E. vol. 329, Optical Disk Technology, (1982), pp. 215–222.

Connell, G. A. N., "Interference Enhanced Kerr Spectroscopy for Very Thin Absorbing Films", *Applied Physics Letter*, Feb., 1982.

Gambino, R. J. and Cuomo, J. U., "Selective Resputtering-Induced Anisotropy in Amorphous Films", *J. Vac. Sci. Technol.*, Mar./Apr. 1978, pp. 296–301.

Bartolini, R. A., et al., "Optical Disk Systems Emerge" *IEEE Spectrum*, Aug., 1978 pp. 20–28.

Mansuripur, M. and Connell, G. A. N., "Thermal Aspects of Magneto Optical Recording", *J. Appl. Phys.*, Sept. 1983.

Togami, Y., et al., "Amorphous Thin Film Disk for Magneto-Optical Memory", *SPIE Optical Disk Technology*, 1982.

MULTI-LAYER AMORPHOUS MAGNETO OPTICAL RECORDING MEDIUM

DESCRIPTION

This application is a continuation-in-part of application Ser. No. 495,176 filed May 17, 1983, now abandoned.

TECHNICAL FIELD

This invention relates to amorphous thin film magnetic materials. More particularly, it pertains to magnetic compositions having magnetic anisotrophy, whereby the thin film possesses a stable magnetic easy axis perpendicular to the plane of the film itself. These compositions can be used as light modulators, in which light interacting with the thin film is affected by the presence of a magnetic domain at the incident spot.

BACKGROUND

Magneto-optic recording media are also known by several other names: thermomagnetic media, beam addressable files, and photo-magnetic memories. All of these terms apply to a storage medium or memory element which responds to radiant energy permitting the use of such energy sources as laser beams for both recording and interrogation. Such media modify the character of an incident polarized light beam so that the modification can be detected by an electronic device such as a photodiode.

This modification is usually a manifestation of either the Faraday effect or the Kerr effect on polarized light. The Faraday effect is the rotation of the polarization plane of polarized light which passes through certain magnetized media. The Kerr effect is the rotation of the plane of polarization of a light beam when it is reflected at the surface of certain magnetized media.

Magneto optic recording media have several advantages over known magnetic recording media:

1. The spacing between the medium and recording head is greater, thus reducing potential for contact and
2. Using a pulsed laser beam as the writing means, very high density data storage is possible.
3. With a protective layer on top of a magneto optic layer, the medium is affected less by dust than magnetic media.

In magneto optical recording, data is written into a medium having a preferentially directed remanent magnetization by exposing a localized area (spot or bit) on the recording medium to an electromagnetic or other energy source of sufficient intensity to heat the recording medium above its compensation or Curie point temperature and simultaneously biasing the medium with a magnetic field. Preferably, the energy source is a laser which produces a monochromatic output beam. The magnetic field required to reverse the magnetization of the recording medium varies with the temperature to which the recording medium is brought. Generally speaking for a given material, the higher the temperature, the smaller the required magnetic field coercive force.

The write or record operation for both Curie point and compensation point writing is as follows:

1. The medium is initially in a demagnetized state having about equal numbers of magnetic domains with magnetization oppositely directed and perpendicular to the surface of the film. A domain will herein refer to the smallest stable magnetizable region; although in common usage, a domain is a uniformly magnetized region of any size. The medium may be subjected to a saturation magnetic bias field normal to the surface of the film in order to magnetize all the domains in one direction. Alternatively, a selected area of the medium may be magnetized by exposing said area to a continuous light beam and a small magnetic bias field.

2. A small magnetic bias field oriented perpendicular to the surface or plane of the film, but oppositely directed to the magnetic field applied earlier is applied over the entire thin film medium.

3. With the biasing field in place, a light beam from a radiant energy source such as a laser beam is directed toward a selected location or bit on the film where it causes localized heating of the film to a temperature at or above the compensation temperature. When the laser beam is removed, the bit cools in the presence of the biasing magnetic field and has its magnetization switched to that direction. The medium, in effect, has a magnetic switching field which is temperature dependent. The magnetic biasing field applied to the irradiated bit selectively switches the bit magnetization, with the bit momentarily near its compensation temperature under the influence of the laser. The momentary temperature rise reduces the bit coercive force.

In the write operation, the write laser beam (e.g. about 8-12 mW) is focused to the desired diameter (e.g. 1.0 microns) onto the surface of the recording medium by an objective lens.

The memory element or recorded bit is interrogated, or read, nondestructively by passing a low-power (e.g. 1-3 mW) beam of polarized light (e.g. a laser beam) through the bit storage site for a sufficiently short time so as not to heat the medium to change its magnetic state. The read laser beam is normally shaped to a circular cross-section by a prism, polarized and focused to some small diameter (e.g. 1.0 microns) onto the recording medium by a lens. When the read beam has passed through the recorded spot, it is sent through an optical analyzer, and then a detector such as a photodiode, for detection of any change or lack of change in the polarization.

A change in orientation of polarization of the light is caused by the magneto-optical properties of the material in the bit or site. Thus, the Kerr effect, Faraday effect, or a combination of these two, is used to effect the change in the plane of light polarization. The plane of polarization of the transmitted or reflected light beam is rotated through the characteristic rotation angle $\theta$. For upward bit magnetization, it rotates $\theta$ degrees and for downward magnetization $-\theta$ degrees. The recorded data, usually in digital form represented by logic values of 1 or 0 depending on the direction of bit magnetization, are detected by reading the change in the intensity of light passing through or reflected from the individual bits, the intensity being responsive to the quantity of light which is rotated and the rotation angle.

Erasure can be accomplished by simply writing new information over old portions of the medium or by simply exposing any given bit with a laser beam of sufficient intensity and then cooling that bit in the presence of a magnetic field in the direction of the initially applied magnetic field. The entire storage medium can be erased by providing a large magnetic bias field in the original saturation direction which does not require a laser beam. Generally, in the recording process, the external biasing magnetic field is applied by a magnet set above or behind the magneto optic medium, and in the erasing process, the magnet is reversed in direction.

The signal-to-noise ratio (SNR) or carrier-to-noise ratio (CNR) of an erasable magneto optic medium is proportional to $\theta\sqrt{R}$, where R equals reflectivity of the medium and $\theta$ is the angle of rotation. Forty-five decibels in a 30 kHz band width is generally considered the minimum CNR acceptable for direct read after write (DRAW) media. The speed at which the bits can be interrogated and the reliability with which the data can be read depends upon the magnitude of the magneto-optical properties, such as the angle of rotation, of the thin film and upon the ability of the interrogation system to detect these properties. An increase in the angle of rotation $\theta$ usually results in an increase in CNR.

For purposes of this discussion, the noise floor or noise level is measured at the average noise level.

The main parameters that characterize a magneto optic material are the angle of rotation, the coercive force ($H_c$) the Curie temperature and the compensation point temperature. The medium is generally comprised of a single element or multicomponent system where at least one of the components is an amorphous metal composition. Binary and ternary compositions are particularly suitable for these amorphous metal alloys. Suitable examples would be rare earth-transition metal (RE—TM) compositions, such as: Gadolinium-cobalt (Gd—Co), Gadolinium-iron (Gd—Fe), Terbium-iron (Tb—Fe), Dysprosium-iron (Dy—Fe), Gd—Tb—Fe, Tb—Dy—Fe, Tb—Fe—Co, Terbium-iron-chromium (Tb—Fe—Cr), Gd—Fe—Bi (Bismuth), Gd—Fe—Sn (Tin), Gd—Fe—Co, Gd—Co—Bi, and Gd—Dy—Fe.

Japanese patent publication No. 56/143547 discloses a magneto optic medium of the type just discussed. It comprises a thin film of gadolinium-terbium-iron alloy in a ratio of 0.24/0.18/1 which film is more than 1000 angstroms thick when using the Kerr effect and 500 to 800 angstroms thick when using the Faraday effect. The film of this patent also has a 5400 angstrom thick glass (silicon dioxide) film on top of the Gd:Tb:Fe film.

The magneto optic amorphous thin films can be fabricated by known thin film deposition techniques, such as sputtering, evaporation and splat cooling. In splat cooling a hot liquid of the film constituents is incident on a cool surface where they are quenched and solidified rapidly to form an amorphous bulk film. Generally, no matter what deposition rate is used, the substrate temperature must be less than that at which crystallization occurs in order to provide amorphous magnetic materials.

The preferred process for thin film deposition is sputtering. Typical known sputtering conditions for amorphous thin films are: initial vacuum less than $1 \times 10^{-5}$ Torr; sputtering pressure of from $3 \times 10^2$ to $2 \times 10^{-2}$ Torr; pre-sputtering of a sputtering source of material to clear the surface thereof; substrate temperature of 30° to 100° C.; and an argon partial pressure.

In the cathodic sputtering process, argon gas ions bombard the solid alloy target cathode in the sputtering chamber dislodging metal atoms by transferring the momentum of the accelerated ions to the metal atoms near the surface of the target. The cathode is said to glow, and the mass of ionized gas between the cathode and the anode is a plasma. The substrate is placed at the anode, and the metal alloy atoms traverse the space between the anode and cathode to deposit or condense on the substrate.

DISCLOSURE OF INVENTION

The invention is summarized as an erasable magneto optical recording medium comprising:

A. a magnetizable amorphous film having a magnetic anisotropy perpendicular to the film surface, said film being characterized by having: (i) a multiplicity of magnetic domains substantially all of which have a domain size of less than 500 angstroms, and (ii) a thickness greater than about 5 nanometers;

B. at least one transparent dielectric layer covering at least one side of the film of part A. and characterized by a thickness of about 30 to 200 nanometers and an index of refraction greater than about 1.2, said transparent dielectric layer being located on either side of the magnetizable amorphous film; and C. a substrate having a reflective surface which reflective surface covers a side of either the film of part A. or the transparent dielectric layer of part B;

the relative thicknesses of the magnetizable amorphous film and the transparent dielectric layer being selected to yield a magneto optic angle of rotation exceeding that of the same recording medium without the dielectric layer; said recording medium being characterized by a carrier-to-noise ratio of at least 47 decibels measured in a 30 kilohertz band width.

Domain size as used herein means the greatest dimension of the domain measured in the plane of the film.

Many film substrates can be used. They may be formed of any material which is dimensionally stable, minimizing radial displacement variations during recording and playback. Semiconductors, insulators, or metals can be used. Suitable substrates include glass, spinel, quartz, sapphire, aluminum oxide, metals such as aluminum and copper, and polymers such as polymethyl-methacrylate (PMMA) and polyester. The substrate is typically in the form of a disc.

When a magnetizable amorphous film is deposited on a reflector, it is known that the magneto optic rotation is increased because the Faraday effect is added to the Kerr effect. The former effect rotates the plane of polarization of the light as it passes back and forth through the magneto-optic layer while the Kerr effect rotates it at the surface of the layer. The reflective surface may be a smooth, highly polished surface of the substrate itself, or it may be the surface of a separate reflecting layer deposited by techniques known in the art such as vacuum vapor disposition. The reflective surface or layer usually has a reflectivity greater than about 50% (preferably 70%) at the recording wavelength. Deposited reflecting layers usually are about 50 to 500 nanometers thick. Typical reflective surfaces or layers are copper, aluminum or gold.

The film of part A. typically comprises an alloy of at least one rare earth element and at least one transition metal and usually is no more than 200 nanometers thick. If it is too thin, the magneto optic film may not absorb enough light in the write mode.

Although the magnetizable film of part A. is amorphous, it has different phases, defined as localized variations in density and/or composition within the film. The existence of different phases adjacent to one another is believed to give rise to perpendicular anisotropy. This property makes it possible to magnetize a bit in the direction opposite to that of the film adjacent to it.

The transparent dielectric layer can be deposited as an intermediate layer between the reflecting layer and the magnetizable amorphous film of part A. Such an intermediate layer would have an index of refraction greater than about 1.2, preferably closer to 3.0. With a high index of refraction intermediate layer, the magneto optic rotation angle can be significantly increased by interference enhancement.

Interference enhancement also occurs when a transparent dielectric anti-reflective layer is deposited on top of the magnetizable amorphous (MO) thin film. Media having one transparent dielectric interference film (either an intermediate or anti-reflective layer) plus the MO and reflective layers are referred to as tri-layer media. Media having both an intermediate layer between the reflector and MO film and an antireflective layer are called quadrilayer media. The anti-reflective layer also is characterized by a thickness usually between about 30 and 200 nanometers and an index of refraction greater than 1.2; although it need not be the exact same material as the intermediate layer.

In cases where the dielectric layer is in between the film of part A. and the reflecting layer or surface in a trilayer construction, it is beneficial to add a transparent passivating layer over the film of part A. Passivation is the change of a chemically active metal surface to a much less reactive state. The transparent passivating layer is typically up to about 300 angstroms thick.

Suitable materials for the passivating layer and the transparent dielectric of the intermediate and anti-reflective layers are: silicon suboxide ($SiO_x$, $x<2$); titanium dioxide, $SiO_2$, cerium oxide, aluminium oxide and aluminum nitride.

The relative thicknesses of the magnetizable amorphous (MO) film and the transparent dielectric layer in the trilayer construction and the intermediate dielectric and anti-reflective layers and magnetizable amorphous film of the quadrilayer construction are selected to yield a magneto optic angle of rotation exceeding that of the medium without the added dielectric and/or antireflective layers. This selection can be made using known optical relationships. These relative thicknesses are preferably also selected to yield a reflectivity for the recording medium less than 30% at the recording wavelength.

The characteristic angle of rotation of these magneto optical media, theta, is relatively large (in the range of 1 to 10 degrees) when measured with a laser diode at a wave length of about 8300 angstroms. This represents an improvement over values of theta reported for rare earth transition metal (RE—TM) multi-layer constructions in the literature.

The above-described erasable optical recording media also have more precise bits (i.e. less average bit roughness) than known media, due to the smaller size of the domains (usually about 100 angstroms). Bits are typically 1 to 5 microns in longest dimension.

Although a Kaufman source or duoplasmatron could be used, the triode sputtering process is preferred for depositing the magnetizable amorphous thin films. Triode sputtering, in addition to the main anode and cathode, has a thermionic cathode (emitter) and anode which has the advantage that a plasma can be maintained at much lower pressures than a direct current glow discharge (even in a magnetic field or magnetron). The ability of a triode sputtering apparatus to maintain an argon plasma at very low vacuums permits the deposition of these thin films at vacuums in the range of $4 \times 10^{-3}$ to $6 \times 10^{-4}$ Torr. The metal atoms which diffuse across the space between the sputtering cathode and anode are able to strike the substrate at a higher energy than they would at a lower vacuum since there are fewer argon ions in the space to interfere with the motion of the metal atoms, giving a greater mean-free path.

With triode sputtering, there are also more nucleation sites on the substrate because of the statistically higher rate of bombardment by energetic film constituent (metal alloy) atoms. This is believed to lead to a magneto optic film having a smoother surface than otherwise would occur. This in turn, leads to a magneto optical recording medium in which the surface of the film yields a background noise level that is at least 50 decibels below the carrier level when a 2 milliwatt peak-to-peak laser beam modulated at about 5.0 megahertz is reflected from the moving unwritten medium moving at a linear velocity of ten meters per second. For the media of this invention, background noise is usually at least 65 decibels below the carrier level under the conditions stated above.

Although the media of this invention are erasable, they may be used in the same application as write-once or non-erasable media.

Characteristic carrier-to-noise ratio for the recording media of this invention is at least 47 decibels.

DETAILED DESCRIPTION OF THE INVENTION

Figure 1:
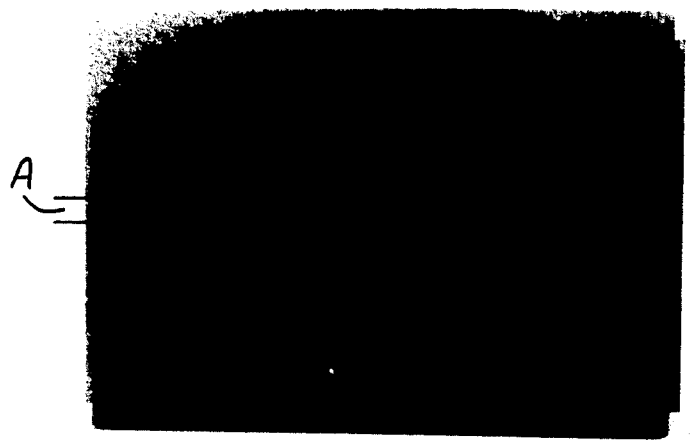
FIG. 1 is a transmission electron microscope photomicrograph at 200,000 X of an amorphous metal alloy thin film magneto optical medium of this invention.

The good performance characteristics of these media (high $\theta$ and CNR) are thought to be attributable to physically identifiable features in the media. The two features believed to be most important are the existence of small domains and the optical constants of the recording medium (high refractive index and low extinction coefficient). Index of refraction (n) and extinction coefficient (k) for a Gd—Tb—Fe alloy thin film of part A of this invention have been determined to be 4.5 and 1.8 respectively. Domain size is preferably less than 200 angstroms in largest dimension. Thus a one micrometer bit can be made up of many magnetized domains. FIG. 1 indicates domain boundary walls of 200 angstroms or less in largest dimension.

Domain formation in magnetic materials is well known. However, the teachings of the prior art lead to the conclusion that as domain size decreases into the extremely small range of this invention, the domains would be unstable. A bit comprised of unstable domains will generally undergo observable changes within about two minutes after it has been recorded, such as changes in location on the medium, CNR and bit size. A loss in CNR can indicate increased bit edge roughness. Stable bits are needed in order to maintain the integrity of recorded data for long periods.

A 5¼ inch (133 mm) diameter disc medium having a Gd—Tb—Fe amorphous alloy film of this invention coated thereon was tested for stability by recording a series of bits at 9 milliwatts laser power using a bias magnetic field of about 250 Oersteds (Oe). The recorded bits were read at 3.0 milliwatts laser power immediately after recording and about 14 days later. Within the limits of experimental error, there were no changes in CNR, bit size, or read signal amplitude between the two readings, indicating good bit and domain stability. Recorded bits on the inventive media have been stable for months.

One amorphous alloy composition particularly well-suited to this invention is gadolinium-terbium-iron ternary alloy. The composition range preferred is 6–15 atom percent gadolinium, 10–20 percent terbium and 65–84 percent iron. One composition made in the course of this invention was about 14% Gd, 17% Tb and 69% Fe. The Curie point temperature of this medium is about 120° C. The thin films made of this composition are generally greater than 50 angstroms thick and have a coercivity sufficient to create a stable memory. At a minimum, this should be about 500 Oersteds (Oe), but a range of 2000 to 3000 Oersteds is generally used.

Figure 2:
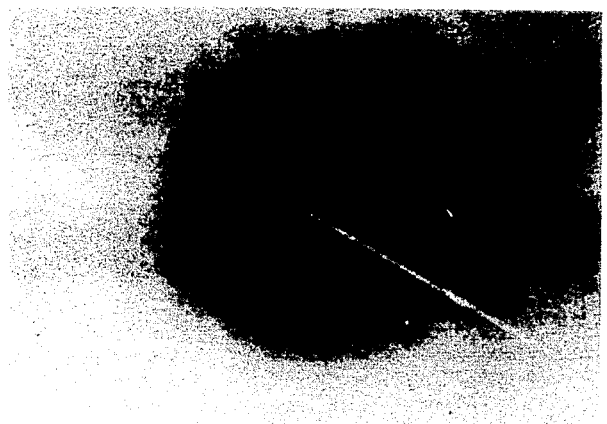
FIG. 2 is an electron beam diffraction pattern of an amorphous metal alloy magneto optical thin film medium of the invention.

As shown by FIG. 2, which is an electron beam diffraction pattern of such a ternary alloy made on a 200 kev apparatus, these materials show a diffraction pattern with broad halos that are not easily assigned a crystalline structure. In diffraction patterns, amorphous character is indicated by line broadening to the point where individual lines overlap. A broadened ring or fuzzy area which is divided by a concentric line is known as a split ring and indicates some localized atomic ordering in the amorphous character of the film.

The information from the photographic image of the diffraction pattern can be translated to a profile plot of the diffracted intensity versus distance from the center of the diffraction pattern to give a more precise indication of amorphous character. The profiles of amorphous materials lack distinct peaks; whereas, those of crystalline materials have a number of quite distinct peaks indicating the lattice spacing or spacing between the atomic orbitals within the lattice.

As explained before, a triode sputtering process is quite suitable for depositing the magneto optic films of this invention. In the experiments by which this process was reduced to practice, the argon used for the sputtering was ultrahigh purity, (99.999 percent minimum purity). Argon flow rate into the triode sputtering apparatus was about 50 standard cubic centimeters per minute (scc/min), at a pressure of about 1.3 milli-Torr (which implies about 3 parts per million of gas present in the system). This represents a decrease in the presence of oxygen present in and flushed through the system by a multiple of at least 20 to 100 times less than ordinary direct current or radio frequency cathode sputtering.

The optical properties of an amorphous thin film are a function of both the composition and the process by which the composition is formed or deposited. It is known that rare earth metals oxidize readily, and the control over this oxidation is an important part of the process of this invention to lead to a product of higher purity. If the anode is given a negative potential, with respect to the plasma, the resulting technique is referred to as bias sputtering. This bias is believed to cause a preferential removal of impurities such as oxygen from the main film by resputtering.

Radio frequency (RF) sputtering (rather than direct current) can be used to effect cleaning and to deposit insulators, such as the transparent dielectric layers mentioned above. In this technique, a radio frequency alternating voltage is applied to the sputtering chamber by means of RF electrodes.

The triode sputtering apparatus comprises a vacuum chamber containing a sputtering cathode target where the metal alloy is placed. The alloy sputters to provide an accumulation on the substrate which is placed on the anode substrate holder. The anode is held at a low negative bias voltage with respect to the chamber wall. The cathode target is water cooled, and the substrate can be made to rotate through an external drive means. A shutter is usually provided between the target and the anode to allow sputter cleaning of the substrate. Magnetically assisted triode sputtering is preferred, in which a magnetic field is imposed in line with the thermionic cathode and anode to confine the electrons to the plasma of ionizing gas and keep them away from the substrate where electron bombardment would cause heating. the sputtering chamber itself is made of stainless steel.

In operation, the sputtering chamber is typically pumped down to some initial background pressure (e.g. $4.0 \times 10^{-7}$ Torr) after which the sputter gas (argon) is introduced. Typically, the substrate is cleaned by pre-sputtering or sputter etching for about 60 seconds at a bias voltage of about 300 volts. The substrate is exposed to the flux of atoms from the target after the predetermined sputtering conditions have been reached. The deposition rate of the magneto optic film is generally 0.5 to 4.0 angstroms per second in the case of the gadolinium terbium iron ternary alloy. A thin thin thermocouple is located near the anode substrate holder to measure the approximate substrate and equilibrium plasma temperature.

The higher vacuum of the triode apparatus appears to result in thin films of higher density and higher index of refraction than known magneto optic films such as those of U.S. Pat. No. 3,965,463.

It has been observed that the character of the magneto optic film at its surface can be different from the bulk properties of the film. This has been particularly evident in comparing coercivity measurements for the surface and the bulk of an unpassivated film. $H_c$ (coercivity) has been found to vary by an order of magnitude in extreme cases. These changes are especially important in an optical memory system, since the interaction of the read optical beam and the RE—TM storage materials occurs in the first 150 to 200 angstroms of the film. Oxidation of the rare earth is suspected of being the main cause of changes in the characteristics of thin film at the surface. By coating the RE—TM films with the passivation layer, the change in characteristics with time has been nearly eliminated.

A depth profile of elements in a sample of the inventive media having a Gd—Tb—Fe alloy film with a covering of $SiO_x$ glass was made by Auger Electron Spectroscopy (AER) and by secondary ion mass spectroscopy (SIMS). The results indicated oxygen level in the Gd—Tb—Fe film of less than one atom percent. Electron Spectroscopy for Chemical Analysis (ESCA) has shown the $SiO_x$ films deposited over the Gd—Tb—Fe films to have x of 1.2–1.6 or an oxygen content of 55–62 atom percent. Depth profile analysis shows oxygen level within the Gd—Tb—Fe films to be about 200 times less than it is in the $SiO_x$ or by implication about 0.3 atom percent.

This invention will be further clarified by considering the examples which follow in this description. They are intended to be purely exemplary.

EXAMPLE I

In the experiments by which the interference enhanced construction was developed, a magneto optic film of a specified thickness was deposited on a reflector. This bi-layer was then overcoated with a third layer of $SiO_x$ dielectric. The choice of the reflector generally relates to its efficiency of reflectivity at the wavelength of interest. The thickness of the magneto optic film will be dependent upon its optical properties as observed at the wavelength of the light of interest. The magneto optic material must be semi-transmissive in order to obtain increases in rotation from both the Faraday and Kerr effects. Films of Gd (11 atom percent) Tb (11 atom percent) with the balance being Fe (as determined by x-ray fluorescence) were deposited on copper coated and uncoated plain glass slides. The angle of rotation, theta, was measured both with a helium neon (HeNe) laser, (wavelength 6328 angstroms) and a laser diode (L.D. wavelength 8300 angstroms). The results are given in Table 1 below.

TABLE 1

| Sample Number | Substrate Cu Coated Glass | Substrate Uncoated Glass | Magneto-Optic Film Thickness | SiOx Thickness | Rotation HeNe | Angle L.D. |
|---|---|---|---|---|---|---|
| 132 | X | | 385° A | 270 | 0.27 | 0.47 |
| 139 | X | | 385° A | 950 | 1.12 | 1.10 |
| 138 | X | | 385° A | 1025 | 1.32 | 1.37 |
| 140 | X | | 385° A | 1065 | 1.27 | 1.55 |
| 145 on 144 | X | | 385° A | 1100 | .45 | 1.71 |
| 141 | X | | 385° A | 1200 | 1.21 | 1.69 |
| 142 | X | | 385° A | 1240 | 0.87 | 1.96 |
| 143 | X | | 385° A | 1300 | 0.45 | 1.73 |
| 130 | X | | 300° A | 300 | 0.36 | 0.47 |
| 129 | X | | 300° A | 435 | 0.35 | 0.44 |
| 128 | X | | 300° A | 610 | | 0.70 |
| 126 | X | | 300° A | 740 | | 0.85 |
| 133 | X | | 300° A | 878 | 1.75 | 1.21 |
| 137 | X | | 300° A | 950 | 1.30 | 1.43 |
| 134 | X | | 300° A | 1010 | 0.86 | 1.68 |
| 136 | X | | 300° A | 1050 | 0.99 | 1.55 |
| 135 | X | | 300° A | 1195 | 0.68 | 1.48 |
| 132 | | X | 385° A | 270 | 0.08 | 0.17 |
| 139 | | X | 385° A | 950 | 0.18 | 0.23 |
| 138 | | X | 385° A | 1025 | 0.41 | 0.29 |
| 140 | | X | 385° A | 1065 | 0.36 | 0.25 |
| 141 | | X | 385° A | 1200 | 0.24 | 0.18 |
| 142 | | X | 385° A | 1240 | 0.58 | 0.26 |
| 143 | | X | 385° A | 1300 | 0.47 | 0.54 |
| 130 | | X | 300° A | 300 | 0.04 | 0.11 |
| 129 | | X | 300° A | 435 | 0.06 | 0.17 |
| 128 | | X | 300° A | 610 | | |
| 126 | | X | 300° A | 740 | 0.01 | 0.11 |
| 133 | | X | 300° A | 878 | 0.03 | 0.12 |
| 137 | | X | 300° A | 950 | 0.31 | 0.12 |
| 134 | | X | 300° A | 1010 | 0.67 | 0.15 |
| 136 | | X | 300° A | 1050 | 0.19 | 0.16 |
| 135 | | X | 300° A | 1195 | 0.73 | 0.14 |
| 144 | X | | 385° A | 0 | 0.23 | 0.40 |
| 147 | X | | 970° A | 950 | 0.70 | 0.76 |
| 147 | | X | 970° A | 950 | 0.68 | 0.75 |

The thicknesses of the magneto optic film and the silicon suboxide film were measured by a double beam interferometer. These results indicate the dependence of rotation angle on both the thickness of the magneto optic film and that of the interference film. They also indicate the clear advantage of using a magneto optic film deposited over a reflector.

Various apparatus and methods are available and known to the art for reading data stored in magneto optic media, as is illustrated in U.S. Pat. No. 3,651,281 FIG. 3 and column 6 and 7. The same sort of arrangement may be used to test magneto optic media with some modifications. The basic testing apparatus comprises a laser diode emitting a beam which is directed by means of various dielectric mirrors, plano mirrors, polarizers, lenses and prisms to the magneto optic medium, and from there to a set of detectors which translate the intensity of the rotated light beam into an electronic signal. The laser diode emits a diverging beam at a wavelength about 8300 angstroms, which is polarized, modulated, collected and collimated by a lens and made circular by a prism. This circular beam is directed by mirrors through a focusing head onto the medium. By virtue of the combined Kerr and Faraday rotations, the plane of polarization of the light is rotated through angle theta. Upon reflection, all of the rotated light, as well as part of the non-rotated light, is directed onto a read path through polarizing beam splitters and toward photodiode detectors. Focusing of the read beam onto the medium can be done by imaging optics means (e.g., a TAOHS type 0.6NA lens head from Olympus Co.).

The bias field used in recording can influence CNR. However, as long as the bias field is more than about 300 Oersteds, CNR is relatively independent of bias field strength.

The triode sputtering process can be used to control several parameters of the final magneto optic film. For example, the magnetic and optical hysteresis curves of gadolinium, terbium, iron alloy films produced by triode sputtering (all the films being of the same composition, 13.5 percent gadolinium, 16 percent terbium and 70 percent iron, and all being about 2000 angstroms thick) were found to become more rectangular as substrate temperature increased.

An additional series of experiments showed that a decreasing rare earth concentration results in an increased tendency to form a longitudinal component in the magneto optic film. An applied magnetic field around the target in the sputtering process also results in the formation of a longitudinally oriented medium. On the other hand, an increase in the deposition rate results in the suppression of the longitudinal component of the ternary alloy to some extent.

The different amorphous phases, which are necessary to the existence of domains adjacent to each other, appear to be dependent upon deposition rate, temperature, and film thickness.

Also, the anode or substrate bias has been found to be a useful control in the triode sputtering process. In one series of experiments, keeping all conditions the same except for substrate bias, which was varied from 0 volts to 623 volts, it was found that the rectilinearity of the magnetic hysteresis curve was increased substantially with increasing anode bias.

EXAMPLE II

A polymerically subbed polished aluminum disc, having a diameter of 30 centimeters was provided. This disc had been made by coating a polished aluminum disc, which had been previously cleaned, with a polymer (e.g. styrene-butadiene polymer). A solution of the polymer (e.g. about 4% solids in a solvent with a boiling point greater than about 140° C.), had been applied to the disc (while it was spinning). The solvent was evaporated, leaving a thin polymeric subbing layer. The function of the subbing layer is to provide a very smooth surface for recording. The polymer should wet and adhere to the aluminum surface.

The subbed disc was coated with a priming layer of chromium oxide (to promote adhesion of the reflecting layer to the substrate) by magnetron sputtering using a chromium target in an atmosphere of argon, water vapor and air. The chromium oxide sputtering was continued for about one to two minutes at a target current of about 500 mA and a background operating pressure of about $2\times10^{-5}$ Torr, thereby obtaining a nucleation, adhesion-promoting layer of about 40 angstroms thick. Other suitable priming materials would be the oxides of titanium, tantalum and aluminum.

Over this, a reflecting copper layer about 1000 angstroms thick was applied by vacuum, resistance evaporation at a background pressure of about $2\times10^{-6}$ Torr. The substrate thus formed was cleaned by sputter etching for about 60 seconds at a bias voltage of about 300 volts in the presence of argon. An intermediate glass film of silicon suboxide ($SiO_x$) was deposited from a silicon monoxide smoke source (obtained from RD Mathis Company in Long Beach, Calif.) to a thickness of about 250 angstroms by sputtering.

The triode sputtering method was then used to coat the prepared substrate with gadolinium, terbium, iron alloy. High-purity argon gas was leaked into the triode sputtering apparatus creating a background pressure of about $1.2\times10^{-3}$ Torr, and the deposition of the ternary alloy film was carried out under a substrate bias of about 300 volts and a target bias of about 300 volts. The deposition rate was in the range of 2.5 to 3 angstroms per second with a final film thickness of about 285 angstroms. At a vacuum of less than about $9.0\times10^{-7}$ Torr, a glass overcoat of about 1360 angstroms thick was deposited from an $SiO_x$ smoke source.

The alloy target used to create this magneto optic film was a mosaic of the desired constituents. Final composition of the deposited films was determined by energy dispersive x-ray fluoresence spectroscopy. The composition of the produced sample number 34-195 was determined to be 6.5 atom percent gadolinium, 10.0 percent terbium and 83.5 percent iron.

Table 2 indicates various magneto optic properties of Sample 34-195 and compares them to certain published values of known magneto optic media. All the data for sample 34-195 was recorded and read at a 115 mm radius on the disc.

for sample Pub-5 is taken from Bell, Alan E., "Optical Data Storage" *Laser Focus,* January, 1983.

FIG. 1 is a transmission electron microscope photomicrograph of the medium of sample 34-195 at 200,000 X. The very small domain size is suggested by this photograph. The space between hash marks A denotes a distance of 200 angstroms, and the small spots, believed to represent domains, appear smaller than distance A in largest dimension.

Figure 3:
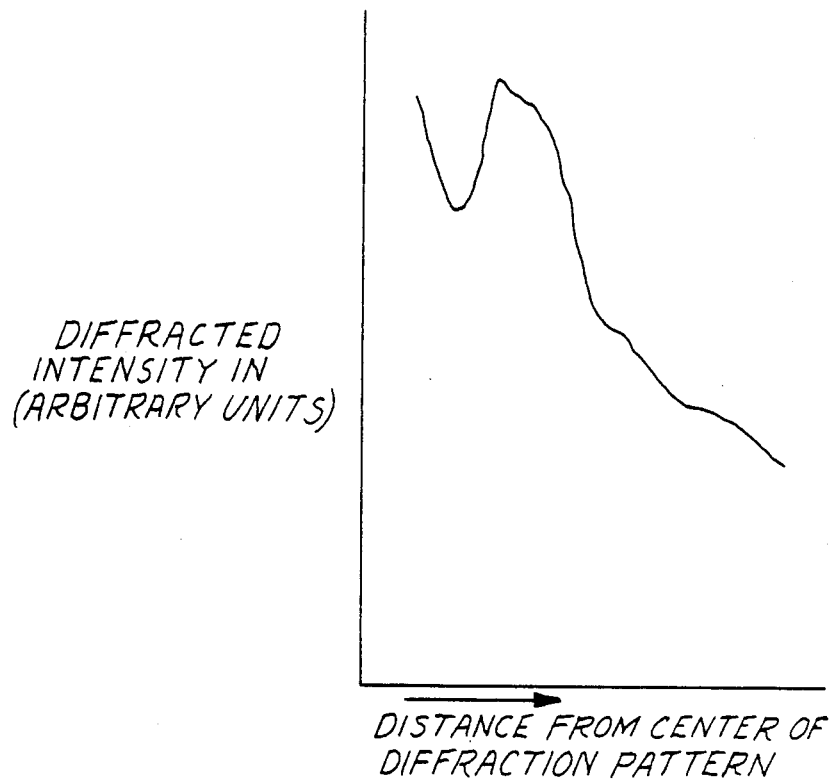
FIG. 3 is a profile of the electron beam diffraction pattern for the inventive magneto optic medium in FIG. 2.

FIGS. 2 and 3 are the electron beam diffraction pattern and profile respectively for the medium of sample 34-195, showing its amorphous character.

Except for the carrier to noise ratio at the lower write laser power of 6 milliwatts, the carrier-to-noise ratio of the inventive sample is significantly greater than that of the published media. It is felt that a CNR of at least 60 can be obtained using the techniques and materials described above.

EXAMPLE III

A sputtering target was made by placing terbium chips onto an iron target having an approximate area of 7742 mm². The chips were about 10 mm×25 mm in size, and the areal ratio used was 25.8% Tb to 74.2% Fe.

5¼ inch (133 mm) diameter polymethyl methacrylate (PMMA) discs were used as substrates. The discs were grooved and had a subbing layer made of 100% solids photopolymer cured with ultraviolet light. One substrate plus four slides (two PMMA and two glass) were loaded into the sputtering chamber, the disc being mounted on a rotating platen.

After pumping down the pressure to about $5.6\times10^{-7}$ mbar, $SiO_x$ was evaporated by resistance heating from a baffled source filled with silicon monoxide granules. It was deposited on the substrate at an average rate of about 5.5 Å/sec. to a thickness of about 400 Å. Pressure during $SiO_x$ evaporation was about $6.2\times10^{-7}$ mbar, and after evaporation it was about $7.3\times10^{-7}$ mbar.

The next step was to radio frequency sputter etch the $SiO_x$ just deposited. This was done in argon using 80 v for 30 seconds.

The triode sputtering apparatus was made ready for Tb—Fe sputtering. The argon flow was set at 28.6 sccm (standard cubic centimeters per minute) while the triode

TABLE 2

| | Sample | | | | | | | | | | | |
|---|---|---|---|---|---|---|---|---|---|---|---|---|
| | 34-195 | 34-195 | 34-195 | 34-195 | 34-195 | 34-195 | 34-195 | Pub. 1 | Pub. 2 | Pub. 3 | Pub. 4 | Pub. 5 |
| Write laser Power (mW) | 6.0 | 7.0 | 8.0 | 9.0 | 10.0 | 11.0 | 12.0 | 8 | 6 | 6 | 5 | |
| Recording Frequency (MHz) | 2 | 2 | 2 | 2 | 2 | 2 | 2 | | | | | up to 2.5 |
| Magnetic bias field (Oe) | 600 | 600 | 600 | 600 | 600 | 600 | 600 | | | | | |
| Resolution Band Width Frequency (KHZ) | 30 | 30 | 30 | 30 | 30 | 30 | 30 | 30 | 30 | 30 | 30 | 30 |
| Read Laser Power (mHz) | 2.0 | 2.0 | 2.0 | 2.0 | 2.0 | 2.0 | 2.0 | 2.5 | 2.5 | 2.5 | 2.5 | 2 |
| Carrier to Noise Ratio (dB) | 43.4 | 49.2 | 50.5 | 51.5 | 52.2 | 52.4 | 52.7 | 40 | 40 | 44 | 40 | 40 |
| Compensation Point (°C.) | 118 | 118 | 118 | 118 | 118 | 118 | 118 | 160 | 140 | 140 | 140 | |
| Disc Speed (rpm) | 780 | 780 | 780 | 780 | 780 | 780 | 780 | 1350 | 1350 | 1350 | 1350 | 720 |

Samples Pub 1-4 are taken from Imamura, Nobutake, "The Development of Magneto-Optical Disc Memory With Semi-conductor Lasers", KDD Research and Development Laboratory, Tokyo, Japan, and the data emitter was warming up. The triode was stable with argon pressure at $1.3\times10^{-3}$ mbar. The direct current (d.c.) bias power supply was turned on and warmed up to a constant voltage of 300 v and a current of 0.69 amps. The target was shuttered during these operations to prevent premature deposition. The triode operated in this warmed up state for about 30 seconds. The radio frequency substrate bias was turned on and adjusted to 80 v with 30 seconds duration.

At this point, the shutter covering the Tb—Fe target was opened and the radio frequency substrate bias adjusted to 200 v. The triode plasma supply operated at 5 amps and 49 v; target bias at a constant 0.69 amps at 300 v. d.c. The sputtering chamber pressure during sputtering was $1.3 \times 10^{-3}$ mbar. Average deposition rate was 1.5-2.0 Å/sec., and deposition of the Tb—Fe was terminated when the Tb—Fe film thickness was about 275 Å. Chamber pressure after this termination (gas flow of) was $5.2 \times 10^{-7}$ mbar.

SiO$_x$ was then coated over the Tb—Fe layer by evaporation, as described previously, to a thickness of about 290 Å at a pressure of $4.6 \times 10^{-7}$ mbar. After a cool down time of about 30 minutes, the system was vented to dry nitrogen, opened up and the samples removed.

The disc and two of the slides (one plastic, one glass) were mounted onto a rotating substrate holder and placed in another vacuum chamber. After pumping down to a background pressure of $7.4 \times 10^{-7}$ Torr, CrO$_x$ primer was deposited over the second SiO$_x$ layer. Oxygen at a flow of 0.5 sccm and argon at 56 sccm were let into the vacuum chamber. The argon and oxygen pressure with the throttle valve closed was $3.3 \times 10^{-3}$. Deposition of CrO$_x$ by magnetically assisted diode sputtering from a chromium target proceeded for four seconds, giving a primer film thickness of about 100 Å.

Next a copper layer was deposited by resistance heating copper in a molybdenum boat. Background pressure was $8 \times 10^{-7}$ Torr. Copper was evaporated and deposited on the CrO$_x$ primer at an average rate of 40 Å/sec. up to a film thickness of about 1000 521 . Background pressure after copper deposition was $10^{-6}$ Torr.

A final SiO$_x$ layer was deposited over the copper layer by electron beam evaporation of silica granules. Background pressure was $8 \times 10^{-7}$ Torr. The SiO$_x$ was evaporated with the electron gun at 8 Kv and was deposited at a rate of about 15 Å/sec. to a total thickness of about 1200 Å.

The disk and slides were removed from the vacuum chamber, and analysis showed the magneto optic layer composition to be about 25 atom % Tb and 75% Fe. The following data were measured on the disc:

| | |
|---|---|
| specular reflectance at 820 nm wavelength (using a spectroradiometer) | 20.4% |
| Hc at room temperature Dynamic tests | 2900 Oe |
| CNR at write laser power of 9 mW | 52 |
| background noise level | 70 dB below carrier level |

EXAMPLE IV

The sputtering target as used in Example III was modified by placing eight cobalt chips, each being approximately 50 mm$^2$ in area, on the iron target surface between the previously described Tb chips. The areal ratios were 25.8% Tb, 67.2% Fe and 7% Co. The process was performed in a similar manner to Example III with the following exceptions:

In depositing the first SiO$_x$ film the sputtering apparatus was pumped down to $2.6 \times 10^{-6}$ mbar, and the SiO$_x$ film was deposited at about 5.4 Å/sec. to a thickness of about 800 Å. Pressure during evaporation was about $2.2 \times 10^{-6}$ mbar and $2.4 \times 10^{-6}$ mbar after evaporation.

In sputtering the Tb—Fe—Co layer: the d.c. target bias was warmed up to a constant current of 0.63 amps; triode plasma supply ran at 47 v; target bias was at 0.63 amps; and chamber pressure after termination of the Tb—Fe—Co film deposition was $2.1 \times 10^{-6}$ mbar.

The second SiO$_x$ coating step was at a pressure of $2.0 \times 10^{-6}$ mbar and deposited SiO$_x$ at 5.1 Å/sec.

The vacuum chamber was pumped down to a background pressure of $9 \times 10^{-7}$ Torr prior to CrO$_x$ deposition.

For the copper coating step, background pressure was $9 \times 10^{-7}$ Torr, and chamber pressure after deposition was $1.24 \times 10^{-6}$ Torr.

Background pressure for the deposition of the final SiO$_x$ layer was $9 \times 10^{-7}$ Torr.

Analysis showed the magneto-optic layer to have the following composition: 23% Tb, 66% Fe and 11% Co.

The following data were measured on the disc:

| | |
|---|---|
| specular reflectance at 820 nm wavelength- | 14% |
| room temperature Hc- | 2600 Oe |
| Dynamic tests | |
| CNR at write laser power of 12 mW- | about 53 |
| background noise level- | 67.4 dB below carrier level. |

With multiple layers, it is possible to control the thermal sensitivity of the magneto optical media by properly choosing the layers. For example, the intermediate layer of the quadrilayer structure (or the dielectric layer of a trilayer which is between the reflector and the MO layer) is a thermal insulator preventing the rapid escape of heat energy from the MO layer into the substrate. The thickness of the intermediate layer can be adjusted to affect thermal sensitivity of the medium; i.e., the amount of laser energy input required to reach compensation point. This in turn affects threshold power (power required to write a feature on the medium). Lower threshold powers are generally possible with the intermediate layer.

The quadrilayer media described herein have a relatively sharp threshold type response for the CNR. That is CNR increases rapidly from threshold power to saturation value (see Table 2). Having a medium with a threshold power at about 6 mW, for example, and a sharp threshold response enables the use of relatively high read laser powers (e.g., 3 mW) resulting in stable operation of the read laser diode. This saturation characteristic of the media also means the media performance is not so critically dependent upon precise hardware performance (i.e., ability to maintain exact power setting).

One preferred quadrilayer medium structure is:

| | Thickness |
|---|---|
| SiO$_x$ | 1250Å |
| MO layer | 300–800Å |
| SiO$_x$ | 200Å |
| Copper reflective layer | 800–1500Å |
| PMMA substrate | |

Since recorded bits are very small, dust particles just a few microns in diameter can cause problems on the surface of a magneto optical medium, preventing the recording of signals or obscuring recorded signals. To alleviate this situation, a transparent protective covering layer is applied to the magneto optical recording media of this invention. It is usually at least 1.2 mm thick and can cover the magnetizable amorphous film, the passivating layer, the dielectric layer of the trilayer media or the anti-reflective layer of the quadrilayer media.

It can even be used to replace the substrate if the layers are applied in reverse order. Thus, the order of layers can be: for trilayer media-transparent substrate, dielectric layer, MO film, reflector or transparent substrate, MO film, dielectric, reflector; and for quadrilayer media-transparent substrate, antireflective layer, MO film, intermediate layer, reflector.

This has the advantages of one less layer, since the covering layer is also the substrate. It is called the substrate incident structure (i.e., light incident on the substrate).

One example of the substrate incident quadrilayer structure is as follows:

|  | Thickness |
| --- | --- |
| PMMA substrate | 1.2 mm |
| $SiO_x$ - antireflective layer | 400Å |
| MO layer | 275Å |
| $SiO_x$ - intermediate dielectric layer | 270Å |
| $CrO_x$ - priming layer | 30–100Å |
| Copper reflective layer | 1250Å |
| $SiO_x$ | 1200Å |

A double-sided medium can be made by adhering two of the above described media together at the surfaces of the reflective metal layer or the last mentioned $SiO_2$ layer, so that the protective PMMA substrates face outward. Thus, this $SiO_2$ layer of one medium would be glued to the same surface of a second medium using an adhesive. The adhesive should be inert to all the materials in the medium, and it should be free of insolubles that might cause deformities or drop outs in the medium. It should also bond well to glass and plastics and have low shrinkage upon curing and aging. Epo-Tek 301 2-part epoxy adhesive made by Epoxy Technology, Inc. of Watertown, Mass. is a suitable adhesive.

For the one-sided structure listed above, it is preferred to adhere a protective sheet to the surface of the last mentioned $SiO_2$ layer. This protective sheet can be of the same material (e.g. PMMA) and thickness as the substrate previously mentioned. The adhesive used to adhere the protective cover to the recording medium can be the same as described in the paragraph above. This protective sheet helps in preventing damage to the medium through handling.

In either case, the transparent protective layer can be a sheet of transmissive material, such as glass or plastic of low thermal conductivity, such as polymethylmethacrylate. The protective covering layer may also be subbed.

The succession of recorded bits may be situated on a track which may be in the form of concentric rings on a media disc or in the form of a spiral. Such tracks or grooves serve as an aid in locating recorded data using servocontrols on the read head. The magneto optical recording media described herein may be grooved by some of the known techniques.

One such technique is photochemical masking comprising the steps of: (a) covering the medium with an auxiliary layer (e.g., chromium) about 0.01 to 0.05 micron thick; (b) covering the auxiliary layer with a photosensitive resin; (c) exposing the resin along the groove pattern by masking; (d) chemically removing the exposed part of the resin; and (e) chemically etching the auxiliary layer to expose the grooves of magneto optical medium. More details on such processes are found in U.S. Pat. Nos. 4,334,007 and 4,329,575.

While certain representative embodiments and details have been shown for the purpose of illustrating the invention, it will be apparent to those skilled in this art that various changes and modifications may be made in this invention without departing from its true spirit or scope which is indicated by the following claims.

What is claimed is:

1. A magneto optical recording medium comprising:
   A. a magnetizable amorphous film having a magnetic anisotropy perpendicular to the film surface, said film being characterized by having: (i) a multiplicity of magnetic domains substantially all of which have a domain size of less than 500 angstroms, and (ii) a thickness greater than about 5 1 nanometers;
   B. at least one transparent dielectric layer covering at least one side of the film of part A. and characterized by a thickness of about 30 to 200 nanometers and an index of refraction greater than about 1.2; and
   C. a substrate having a reflective surface which reflective surface covers a side of either the film of part A. or the transparent dielectric layer of part B.;

the relative thicknesses of the magnetizable amorphous film and the transparent dielectric layer being selected to yield a magneto optic angle of rotation exceeding that of the same recording medium without the dielectric layer; said recording medium being characterized by a carrier-to-noise ratio of at least 47 decibels measured in a 30 kilohertz band width.

2. The magneto optical recording medium of claim 1 in which the relative thicknesses of the magnetizable amorphous films and the transparent dielectric layer are selected to yield a reflectivity for the whole recording medium of less than 30% at the recording wavelength.

3. The magneto optical recording medium of claim 1 in which the transparent dielectric layer is made of a material selected from the group consisting of silicon suboxide, silicon dioxide, titanium dioxide, cerium oxide, aluminum oxide and aluminum nitride.

4. The magneto optical recording medium of claim 1 characterized by a magneto optic rotation angle greater than one degree.

5. The magneto optical recording medium of claim 1 in which the reflective surface is provided by a reflective metal layer on the substrate.

6. The magneto optical recording medium of claim 5 which further comprises a priming layer, comprising an oxide of a metal selected from the group consisting of chromium, titanium, tantalum and aluminum, between the substrate of part C and the reflective metal layer.

7. The magneto optical recording medium of claim 1 in which the magnetizable amorphous film of part A. is no more than about 200 nanometers thick.

8. The magneto optical recording medium as recited in claim 7 which has a transparent dielectric layer located between the magnetizable amorphous film of part A. and the reflective surface and which recording medium further comprises a transparent passivating layer on top of the magnetizable amorphous film of part A.

9. The magneto optical recording medium, as recited in claim 7, which recording medium further comprises a transparent protective covering layer which covers the side of the medium opposite the substrate.

10. The magneto optical recording medium of claim 9 wherein the transparent protective covering layer is at least 1.2 millimeters thick.

11. The magneto optical recording medium of claim 1 wherein the film of part A is further characterized as an alloy of at least one rare earth element and at least one transition metal.

12. The magneto optical recording medium of claim 11 wherein the film of part A has an oxygen concentration of less than about one atom percent.

13. The magneto optical recording medium of claim 12 wherein the film of part A is made of an alloy selected from the group consisting of gadolinium-terbium-iron, terbium-iron, and terbium-iron-cobalt alloys.

14. A magneto optical recording medium comprising:
A. a magnetizable amorphous film having a magnetic anisotropy perpendicular to the film surface, said film being characterized by having: (i) a multiplicity of magnetic domains substantially all of which have a domain size of less than 500 angstroms, and (ii) a thickness greater than about 5 nanometers;
B. an intermediate layer covering one side of the film of part A. and comprising a transparent dielectric characterized by a thickness of about 30 to 200 nanometers, and an index of refraction greater than about 1.2;
C. an anti-reflective layer covering the side of the magnetizable amorphous film of part A opposite the layer of part B, said anti-reflective layer being characterized by a thickness of about 30 to 200 nanometers and an index of refraction greater than about 1.2;
D. a substrate located on the side of either the layer of part B or part C opposite the film of part A;
E. a reflective surface which is either a polished surface of the substrate or a separate reflecting layer of reflective metal, said separate reflecting layer being located on the side of the layer of part B opposite the film of part A;
the relative thicknesses of the intermediate layer, the magnetizable amorphous film and the anti-reflective layer being selected to yield a magneto optic angle of rotation exceeding that of the recording medium without either the intermediate or anti-reflective layer; and said recording medium being characterized by a carrier-to-noise ratio of at least 47 decibels measured in a 30 kilohertz band width.

15. The magneto optical recording medium of claim 14 in which the relative thicknesses of the intermediate layer, the magnetizable amorphous film and the anti-reflective layer are selected to yield a reflectivity for the whole recording medium of less than 30% at the recording wavelength.

16. The magneto optical recording medium of claim 14 in which the layers of parts B and C are independently a material selected from the group consisting of silicon suboxide, silicon dioxide, titanium dioxide, cerium oxide, aluminum oxide and aluminum nitride.

17. The recording medium of claim 14 characterized by a magneto optic rotation angle of greater than one degree.

18. The magneto optical recording medium of claim 14 in which the reflective surface is a reflective metal layer.

19. The magneto optical recording medium of claim 14 wherein the film of part A is further characterized as an alloy of at least one rare earth element and one transition metal.

20. The magneto optical recording medium of claim 19 wherein the film of part A has an oxygen concentration of less than about one atom percent.

21. The magneto optical recording medium of claim 14, wherein the substrate is comprised of a transparent protective material which covers the anti-reflective layer, and the reflective surface is a reflective metal layer located on the intermediate layer of part B on the side opposite the magnetizable amorphous film.

22. A double sided magneto optical recording medium which comprises two of the media of claim 21 adhered together so that their protective substrates face outward.

23. The magneto optical recording medium of claim 14 on which the reflective metal layer is on the substrate and which further comprises a priming layer, which comprises an oxide of a metal selected from the group consisting of chromium, titanium, tantalum, and aluminum, between the substrate and the reflective metal layer.

24. The magneto optical recording medium recited in claim 23, wherein the substrate is located on the side of the layer of part B, and there is a transparent protective covering layer covering the antireflective layer.

25. The magneto optical recording medium of claim 24 wherein the transparent protective covering layer is at least 1.2 millimeters thick.

26. A magneto optical recording medium comprising:
A. a magnetizable amorphous film having a magnetic anisotropy perpendicular to the film surface, said film being characterized by having: (i) a multiplicity of magnetic domains substantially all of which have a domain size of less than 500 angstroms, and (ii) a thickness greater than about 5 nanometers;
B. a transparent dielectric layer covering one side of the film of part A. and characterized by a thickness of about 30 to 200 nanometers, and an index of refraction greater than about 1.2, said transparent dielectric layer being located on either side of the magnetizable amorphous film;
C. a reflecting layer covering a side of either the film or part A. or the transparent dielectric layer of part B.; and
D. a substrate comprising a transparent protective covering material, covering the side of the medium opposite the reflecting layer;
the relative thicknesses of the magnetizable amorphous film and the transparent dielectric layer being selected to yield a magneto optic angle of rotation exceeding that of the same recording medium without the dielectric layer; said recording medium being characterized by a carrier-to-noise ratio of at least 47 decibels measured in a 30 kilohertz band width.

* * * * *

UNITED STATES PATENT AND TRADEMARK OFFICE
CERTIFICATE OF CORRECTION

PATENT NO. : 4,569,881

DATED : February 11, 1986

INVENTOR(S) : Robert P. Freese, et al.

It is certified that error appears in the above-identified patent and that said Letters Patent is hereby corrected as shown below:

In the list of references cited on the front page, U.S. Patent 3,969,463 should be --3,965,463--.

In the Abstract, line 14, "magnetic" should be --magneto--.

In Column 1, line 13 "anisotrophy" should be --anisotropy--.

In Column 1, line 41, "wear." should be added at the end of the line.

In Column 5, line 43, "optical" should be --optic--.

In Column 13, line 35, "521" should be --$\overset{\circ}{A}$.--

In Column 16, line 20, "5 1 nanometers" should be --5 nanometers--.

Signed and Sealed this

Sixth Day of May 1986

[SEAL]

Attest:

DONALD J. QUIGG

Attesting Officer

Commissioner of Patents and Trademarks